(12) United States Patent
Garcia et al.

(10) Patent No.: US 10,866,259 B1
(45) Date of Patent: Dec. 15, 2020

(54) IMPACT SENSOR

(71) Applicant: Kenobi Tech, LLC, Rutherford, NJ (US)

(72) Inventors: Jessica Noel Garcia, Clifton, NJ (US); Christopher Daniel Basilico, East Brunswick, NJ (US)

(73) Assignee: Tozuda, LLC, Rutherford, NJ (US)

( * ) Notice: Subject to any disclaimer, the term of this patent is extended or adjusted under 35 U.S.C. 154(b) by 331 days.

(21) Appl. No.: 15/679,626

(22) Filed: Aug. 17, 2017

(51) Int. Cl.
| | |
|---|---|
| *G01P 15/06* | (2006.01) |
| *G01L 5/00* | (2006.01) |
| *G01P 1/07* | (2006.01) |
| *B65D 79/02* | (2006.01) |
| *A42B 3/04* | (2006.01) |

(52) U.S. Cl.
CPC .......... *G01P 15/06* (2013.01); *G01L 5/0052* (2013.01); *G01P 1/07* (2013.01); *A42B 3/046* (2013.01); *B65D 79/02* (2013.01)

(58) Field of Classification Search
CPC .......... G01P 15/06; G01P 1/07; G01L 5/0052; A42B 3/046; B65D 79/02
See application file for complete search history.

(56) References Cited

U.S. PATENT DOCUMENTS

| | | | | |
|---|---|---|---|---|
| 2,601,440 A | * | 6/1952 | Kerrigan | B65D 79/02 |
| | | | | 116/203 |
| 3,149,606 A | * | 9/1964 | Arthur | G01V 1/181 |
| | | | | 116/203 |
| 3,889,130 A | | 6/1975 | Breed | |
| 3,909,568 A | * | 9/1975 | Greenhut | G01P 15/135 |
| | | | | 200/61.45 R |
| 4,060,004 A | * | 11/1977 | Scholz | B60R 21/00 |
| | | | | 340/436 |
| 4,125,085 A | * | 11/1978 | Rubey | G01P 15/036 |
| | | | | 116/203 |
| 4,177,751 A | | 12/1979 | Rubey | |
| 4,198,864 A | | 4/1980 | Breed | |
| 4,237,736 A | | 12/1980 | Wright | |
| 4,470,302 A | * | 9/1984 | Carte | G01P 15/04 |
| | | | | 116/203 |
| 4,943,690 A | * | 7/1990 | Bitko | H01H 29/002 |
| | | | | 200/182 |

(Continued)

OTHER PUBLICATIONS

Trans-Monitor TD Shock Indicator. Impact-O-Graph Devices. May 3, 2017. 2 pages.

(Continued)

*Primary Examiner* — Nimeshkumar D Patel
*Assistant Examiner* — Tania Courson
(74) *Attorney, Agent, or Firm* — Joseph E. Maenner; Maenner & Associates, LLC

(57) ABSTRACT

An impact sensor has a hollow container with a spring extending therethrough. A liquid is present in the cavity. The spring biases opposing valve balls to a closed position, preventing dye that is located exterior of the cavity from entering the cavity. When a force applied to the sensor exceeds a first predetermined value, the spring is compressed or displaced, allowing at least one of the valve balls to move from the closed position to an open position, thereby allowing the dye at the moving valve ball to pass into the cavity, mixing with the liquid and providing a visual indication of the exceeded force upon the sensor.

15 Claims, 3 Drawing Sheets

(56) References Cited

U.S. PATENT DOCUMENTS

| | | | | |
|---|---|---|---|---|
| 4,982,684 A * | 1/1991 | Rubey | ................ | G01P 15/0891 |
| | | | | 116/203 |
| 5,378,865 A * | 1/1995 | Reneau | ................ | G01P 15/18 |
| | | | | 200/61.45 M |
| 6,698,272 B1 * | 3/2004 | Almirante | ................ | G01K 3/00 |
| | | | | 374/E3.001 |
| 8,028,643 B2 * | 10/2011 | Pan | ................ | G01P 15/06 |
| | | | | 116/200 |
| 8,234,993 B2 * | 8/2012 | Naruishi | ................ | G01L 5/008 |
| | | | | 116/200 |
| 8,234,994 B1 * | 8/2012 | Branch | ................ | G01L 5/0052 |
| | | | | 116/201 |
| 8,307,775 B2 * | 11/2012 | Naruishi | ................ | G01C 9/10 |
| | | | | 116/200 |
| 8,646,401 B2 * | 2/2014 | Branch | ................ | G01L 5/0052 |
| | | | | 116/201 |
| 8,671,582 B2 * | 3/2014 | Branch | ................ | G01C 9/08 |
| | | | | 33/365 |
| 9,103,734 B2 * | 8/2015 | Branch | ................ | G01L 5/0052 |
| 9,103,849 B2 * | 8/2015 | Branch | ................ | G01P 15/06 |
| 9,593,968 B1 | 3/2017 | Garcia | | |
| 9,622,531 B1 | 4/2017 | Crispno | | |
| 2007/0194943 A1 * | 8/2007 | Fitzer | ................ | G01P 15/036 |
| | | | | 340/686.1 |
| 2008/0217144 A1 * | 9/2008 | Honer | ................ | H01H 29/002 |
| | | | | 200/61.47 |
| 2012/0312224 A1 * | 12/2012 | Branch | ................ | G01L 5/0052 |
| | | | | 116/203 |

OTHER PUBLICATIONS

International Search Report for PCT/US2018/046906. dated Dec. 13, 2018. 4 pages.

Written Opinion for PCT/US2018/046906. dated Dec. 13, 2018. 5 pages.

PCT/US18/46906 International Preliminary Report on Patentability. dated Feb. 18, 2020.

* cited by examiner

IMPACT SENSOR

BACKGROUND OF THE INVENTION

The present invention is in the technical field of sensing devices. More particularly, the present invention is in the technical field of acceleration sensing devices. More particularly, the present invention is in the technical field of mechanical acceleration sensing devices. More particularly, the present invention is in the technical field of mechanical acceleration sensing devices with visual indicators.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is an impact sensor having an elongate hollow cavity with a spring extending therethrough. A liquid is present in the cavity. The spring biases opposing valve balls to a closed position, preventing dye that is located exterior of the cavity from entering the cavity. When a force applied to the sensor exceeds a first predetermined value, the spring is compressed or displaced, allowing at least one of the valve balls to move from the closed position to an open position, thereby allowing the dye at the moving valve ball to pass into the cavity, mixing with the liquid and providing a visual indication of the exceeded force upon the sensor.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1:
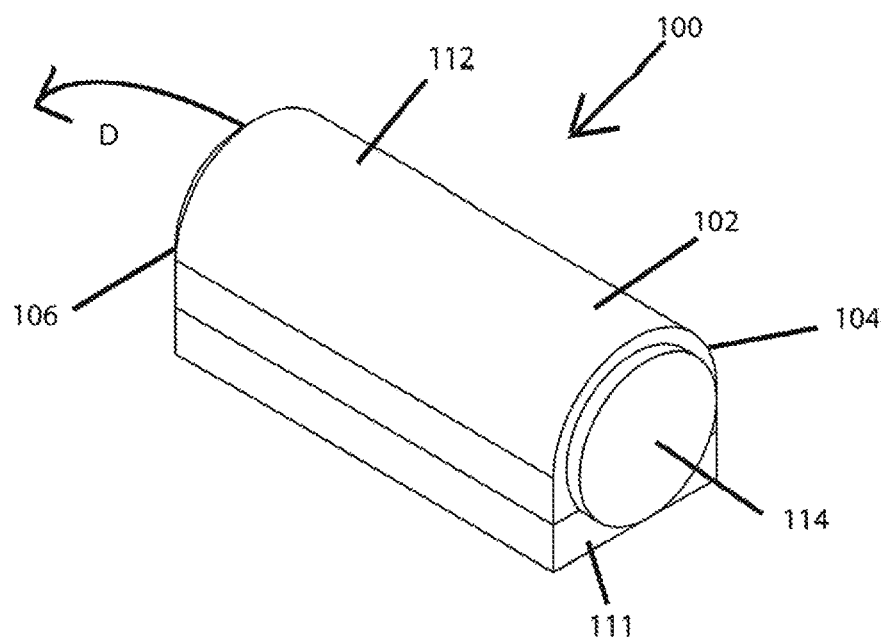
FIG. 1 is a perspective view of an impact sensor according to an exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Referring to the Figures, the present invention includes a force sensor that is used to indicate when an excessive amount of force is exerted upon the sensor. In an exemplary embodiment, the inventive sensor is attached to or is integral with a helmet that is being worn by an athlete; a hardhat being worn by a construction worker; a combat helmet being worn by a soldier; or other type of protective headgear. Activation of the sensor provides a visual indication that the wearer suffered a blow that may be excessive and should result in the wearer being examined by a medical professional for potential head trauma.

In an alternative exemplary embodiment, the inventive sensor is attached to a package or shipping material. Activation of the sensor provides a visual indication that the package or shipping material experienced excessive jarring or jolt that could result in damage to the material being shipped.

Referring to FIGS. 1-4, a sensor 100 according to a first exemplary embodiment of the present invention is shown. Sensor 100 is generally a hollow elongate cylinder 110 having a transparent or translucent body 102 having a first end 104, a second end 106, and an elongate cavity 108 extending therethrough along a longitudinal axis 110. Body 102 has a generally planar base 111 so that sensor 100 can be affixed to a flat surface. Body 102 also has a generally arcuate top portion 112 extending upwardly from base 111 such that an exemplary height of body 102 is about 0.625 inches. Top portion 112 can be constructed separately from base 111 and fixedly connected together during manufacture of sensor 100, forming cavity 108. In an exemplary embodiment, body 102 is constructed from polycarbonate and has a length of about 1.446 inches. While exemplary dimensions are provided above, those skilled in the art will recognize that other dimensions can be used. By way of example only, the height of body 102 can be between about 0.25 inches and about 2 inches, while the length of body 102 can be between about 1 inch and about 3 inches.

A first end cap 114 is attached to first end 104 and a second end cap 116 is attached to second end 106. Cavity 108 has a first opening 118 proximate to first end 104 and a second opening 120 proximate to second end 106. A helical spring 124 extends along axis 110 and biases a first valve ball 126 against first opening 118 and a second valve ball 128 against second opening 120. In an exemplary embodiment, spring 124 can be constructed from a non-corrosive material, such as stainless steel, and valve balls 126, 128 can be constructed from steel or a polymer, such as buna-nitrile rubber. In an exemplary embodiment, a distance between balls 126, 128 can be about 0.686 inches.

Spring 124 is selected based on the amount of force that it is desired for sensor 110 to experience prior to activating sensor 100. By way of example only, the distance between valve balls 126, 128 can also be varied for spring 124 to yield at a predetermined force upon sensor 100. For example, the distance between valve balls 126, 128 can be between about 0.35 inches and about 2.5 inches, although those skilled in the art will recognize that other distances can be provided. Also, the material of spring 124, the thickness of spring 124, and/or the K-constant of spring 124 can be selected to yield at a predetermined force upon sensor 100.

Valve balls 126, 128 have a larger diameter than each of first and second openings 118, 120 such that valve balls 126, 128, when biased by spring 124, close off openings 118, 120 to fluid communication through openings 118, 120, forming a closed cavity 108. In an exemplary embodiment, balls 126, 128 have a diameter of about 0.125 inches, while openings 118, 120 each have a diameter of about 0.12 inches.

With valve balls 118, 120 closing cavity 108, a 130 fills cavity 108. In an exemplary embodiment, fluid 130 can be a water/propylene glycol mix or other suitable fluid.

Distal of cavity 108, first opening 118 opens to a first frusto-conical opening 132. Similarly, distal of cavity 108, second opening 120 opens to a second frusto-conical opening 134. First end cap 114 includes an indent 136 and second end cap 116 includes a second indent 138.

First frusto-conical opening 132 and first indent 136 define a first dye cavity 140 for retaining a dye 142 therein. Second frusto-conical opening 134 and second indent 138 define a second dye cavity 144 for retaining a dye 146 therein. Dye 142, 146 can be a liquid, a dry powder, or other suitable type of dye.

Figure 5:
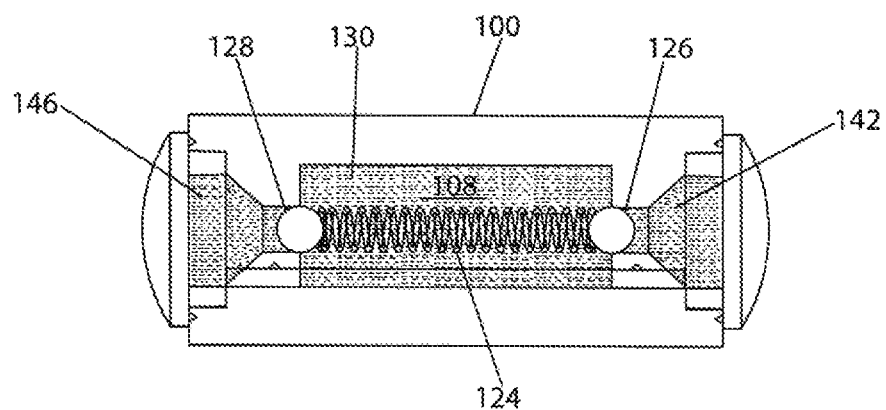
FIG. 5 is a schematic view of an impact sensor according to an exemplary embodiment of the present invention in a condition prior to experiencing excessive force.

Sensor 100 is fixed to a surface (not shown) of a device (not shown) on which it is desired to know if a predetermined force has been exceeded. FIG. 5 shows a schematic view of sensor 100 before experiencing an excessive force and FIG. 6 shows a schematic view of sensor 100 after experiencing an excessive force sufficient to activate sensor 100.

Figure 6:
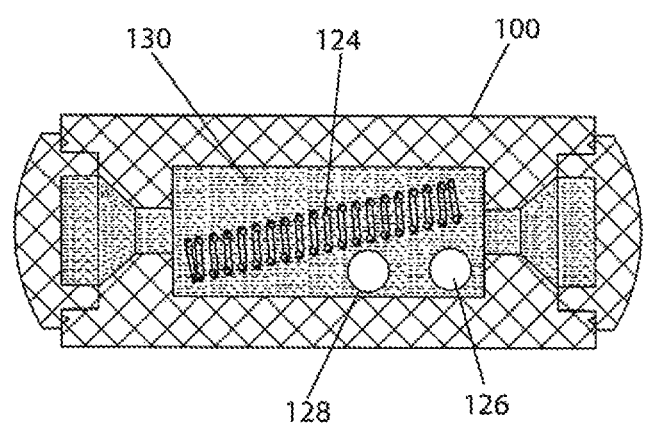
FIG. 6 is a schematic view of the impact sensor shown in FIG. 5 in a condition after experiencing excessive force.

While an excessive force along axis 110 forces one of valve balls 126, 128 to compress spring 124 to a point where the one valve ball 126, 128 can fall from a position shown in FIG. 5 to a position shown in FIG. 6, thereby opening first and second openings 118, 120 and allowing the dye 142, 146 to enter cavity 108 and mix with fluid 130, coloring fluid 130 as shown in FIG. 6. With the falling of the one valve ball 126, 128, spring 130 also falls, allowing the other of valve ball 128, 126 to fall as well.

Those skilled in the art will recognize that excessive forces in other directions as well can activate sensor 100. Linear forces along axis 110 and orthogonal to axis 110 as well as rotational forces about axis 110 and the axes orthogonal to axis 110, and combinations of those forces can activate sensor 100.

Figure 4:
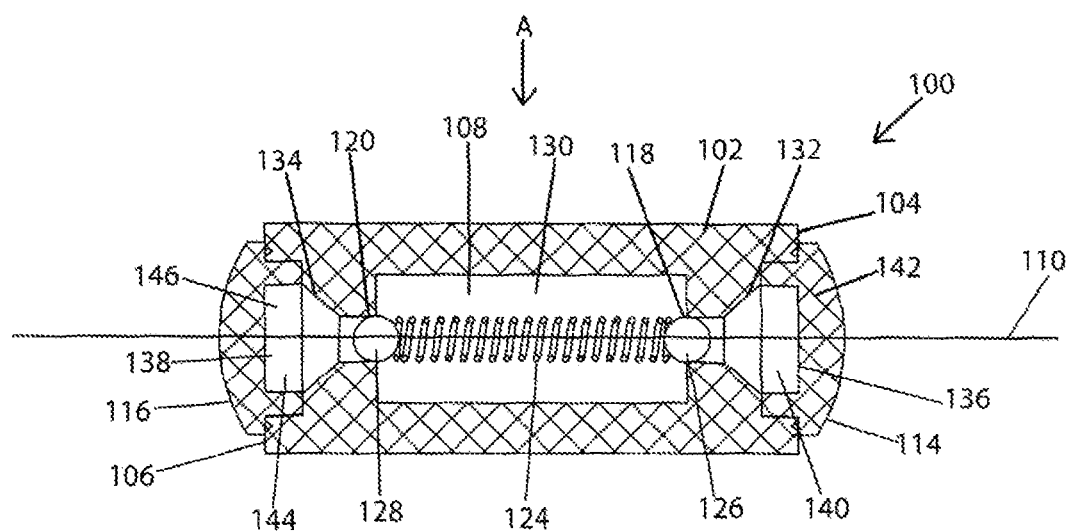
FIG. 4 is a sectional view of the impact sensor of FIG. 1, taken along lines 4-4 of FIG. 3.

By way of example only, an excessive force normal to axis 110, such as shown by arrow "A" in FIG. 4, can pull spring 124 away from either or both of valve balls 126, 128, allowing valve balls 126, 128 to fall and open openings 118, 120, allowing dye 142, 146 to enter cavity 108 and mix with fluid 130 as described above.

Figure 2:
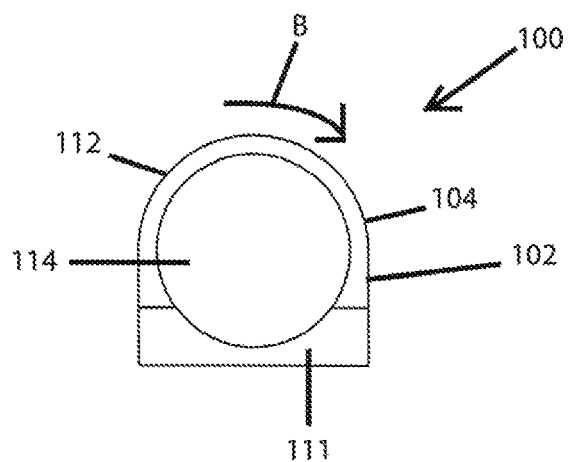
FIG. 2 is an end elevational view of the impact sensor shown in FIG. 1.
Figure 3:
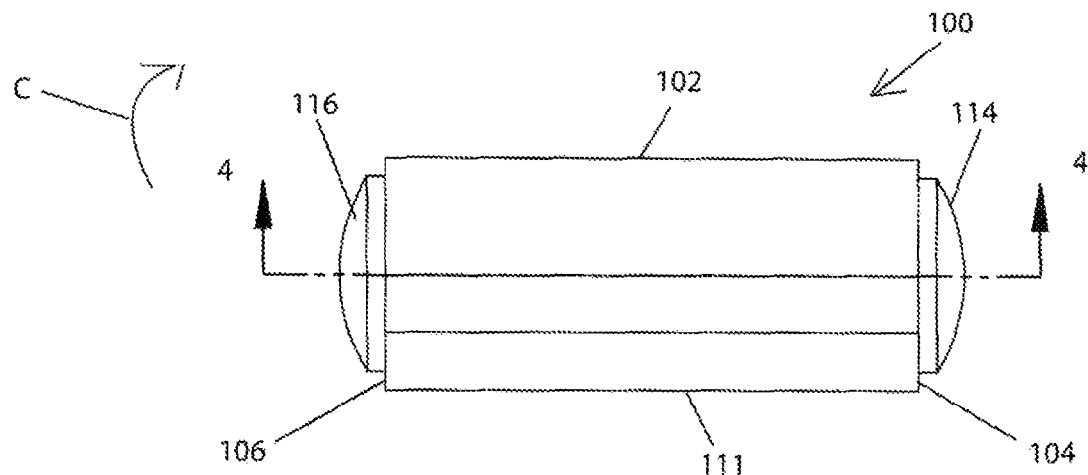
FIG. 3 is a top plan view of the impact sensor shown in FIG. 1.

Still alternatively, an excessive rotational force applied to sensor 100, as shown by arrow "B" in FIG. 2, arrow "C" in FIG. 3, or arrow "D" in FIG. 1, also can pull spring 124 away from either or both of valve balls 126, 128, allowing valve balls 126, 128 to fall and open openings 118, 120, allowing dye 142, 146 to enter cavity 108 and mix with fluid 130 as described above.

It will be further understood that various changes in the details, materials, and arrangements of the parts which have been described and illustrated in order to explain the nature of this invention may be made by those skilled in the art without departing from the scope of the invention as expressed in the following claims.

We claim:
1. An impact sensor comprising:
an elongate housing having a first end, a second end, and a central longitudinal axis extending between the first end and the second end;
a first dye cavity at the first end, the first dye cavity having a first dye disposed therein;
a second dye cavity at the second end, the second dye cavity having a second dye disposed therein;
an elongate cavity extending along the central longitudinal axis between the first dye cavity and the second dye cavity;
a first opening providing fluid communication between the first dye cavity and the elongate cavity;
a second opening providing fluid communication between the second dye cavity and the elongate opening;
a first sealing member releasably disposed in the first opening;
a second sealing member releasably disposed in the second opening; and a biasing member having a first end biasing the first sealing member in the first opening and a second end biasing the second sealing member in the second opening.

2. The impact sensor according to claim 1, wherein each of the first dye cavity and the second dye cavity retains a dye therein.

3. The impact sensor according to claim 2, wherein the dye comprises a liquid.

4. The impact sensor according to claim 2, wherein the dye comprises a solid.

5. The impact sensor according to claim 2, wherein the elongate cavity retains a liquid therein.

6. The impact sensor according to claim 1, wherein the biasing member comprises a helical spring.

7. The impact sensor according to claim 6, wherein the spring has a spring constant selected to yield at a predetermined force upon the sensor such that, upon exceeding the predetermined force, the biasing member ceases biasing at least one of the first sealing member and the second sealing member.

8. The impact sensor according to claim 1, wherein the biasing member extends along the central longitudinal axis.

9. An impact sensor comprising;
a body;
a first dye containing cavity disposed at a first end of the body;
a fluid containing cavity adjacent to the first dye containing cavity;
an opening providing fluid communication between the first dye containing cavity and the fluid containing cavity;
a sealing member releasably disposed in the opening; and
a biasing member directly engaging the sealing member and biasing the sealing member against the opening, preventing fluid flow between the first dye containing cavity and the fluid containing cavity.

10. The impact sensor according to claim 9, wherein the biasing member comprises a spring.

11. The impact sensor according to claim 9, wherein the biasing member is sized to release the sealing member from the opening after experiencing a predetermined force.

12. The impact sensor according to claim 11, wherein, after experiencing the predetermined force, the dye is adapted to flow through the opening and into the fluid containing cavity.

13. The impact sensor according to claim 9, wherein the biasing member is in the fluid containing cavity.

14. The impact sensor according to claim 9, wherein the sealing member comprises a ball.

15. The impact sensor according to claim 9, further comprising a second dye containing cavity, such that the fluid containing cavity is disposed between the first dye containing cavity and the second dye containing cavity.

* * * * *